(12) United States Patent
Iwamoto et al.

(10) Patent No.: US 12,030,715 B2
(45) Date of Patent: Jul. 9, 2024

(54) TRANSPORT SYSTEM AND TRANSPORT METHOD

(71) Applicant: TOYOTA JIDOSHA KABUSHIKI KAISHA, Toyota (JP)

(72) Inventors: Kunihiro Iwamoto, Nagakute (JP); Yuta Itozawa, Nagoya (JP); Hirotaka Komura, Tokyo (JP); Yutaro Takagi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/650,905

(22) Filed: Feb. 14, 2022

(65) Prior Publication Data
US 2022/0258658 A1 Aug. 18, 2022

(30) Foreign Application Priority Data

Feb. 16, 2021 (JP) .................. 2021-022732

(51) Int. Cl.
| B65G 1/04 | (2006.01) |
| B25J 5/00 | (2006.01) |
| B60P 3/00 | (2006.01) |
| B62D 63/02 | (2006.01) |
| B65G 1/137 | (2006.01) |
| B66F 9/06 | (2006.01) |
| B66F 9/065 | (2006.01) |
| B60P 1/64 | (2006.01) |

(52) U.S. Cl.
CPC ............ B65G 1/0435 (2013.01); B25J 5/007 (2013.01); B60P 3/007 (2013.01); B62D 63/025 (2013.01); B65G 1/1375 (2013.01); B66F 9/063 (2013.01); B66F 9/065 (2013.01); B60P 1/6409 (2013.01); B60P 1/6427 (2013.01); B60P 1/6481 (2013.01); B60P 1/649 (2013.01)

(58) Field of Classification Search
CPC ........ B25J 5/007; B60P 3/007; B62D 63/025; B65G 1/0435; B65G 1/1375; B65G 2209/06; B66F 9/063; B66F 9/065
USPC ........................................... 414/280
See application file for complete search history.

(56) References Cited

U.S. PATENT DOCUMENTS

| 3,727,778 A * | 4/1973 | Hollenbach | ............... B66F 9/06 414/277 |
| 4,492,504 A * | 1/1985 | Hainsworth | ............... B66F 9/07 414/280 |
| 4,678,390 A * | 7/1987 | Bonneton | ............ B65G 1/1375 414/416.03 |

(Continued)

FOREIGN PATENT DOCUMENTS

| EP | 3533691 A1 * | 9/2019 | .......... B62D 63/025 |
| JP | H04-028700 A | 1/1992 | |

(Continued)

*Primary Examiner* — James Keenan
(74) *Attorney, Agent, or Firm* — Dickinson Wright, PLLC

(57) ABSTRACT

The transport system has a transport vehicle. The transport vehicle includes two racks, each of the two racks being configured to accommodate a plurality of boxes, and a drive arm that is disposed at a position between the two racks and that moves each of the boxes in and out of each of the racks. The transport vehicle moves each of the boxes in and out of each of the two racks by changing an orientation of the drive arm.

13 Claims, 20 Drawing Sheets

(56) References Cited

U.S. PATENT DOCUMENTS

| | | | | |
|---|---|---|---|---|
| 5,211,523 | A * | 5/1993 | Andrada Galan | B66F 9/063 |
| | | | | 414/280 |
| 8,928,481 | B2 * | 1/2015 | Abe | B65G 1/0421 |
| | | | | 705/28 |
| 9,592,759 | B1 * | 3/2017 | Theobald | B65G 1/0492 |
| 10,343,881 | B2 * | 7/2019 | Guo | B65G 1/10 |
| 10,683,171 | B2 * | 6/2020 | Jarvis | B65G 1/1375 |
| 10,793,353 | B2 * | 10/2020 | Nakano | B66F 9/06 |
| 10,962,963 | B2 * | 3/2021 | Zanger | B66F 9/063 |
| 11,485,211 | B2 * | 11/2022 | Shih | B62D 63/025 |
| 11,530,120 | B2 * | 12/2022 | Ueda | B65G 1/0435 |
| 11,661,274 | B1 * | 5/2023 | Patel | B25J 9/0096 |
| | | | | 414/278 |
| 2018/0208398 | A1 * | 7/2018 | Haveman | B66F 9/063 |
| 2018/0305124 | A1 | 10/2018 | Guo et al. | |
| 2019/0232504 | A1 * | 8/2019 | Radetzki | B25J 5/007 |
| 2019/0352092 | A1 * | 11/2019 | Zheng | B66F 9/075 |
| 2020/0377153 | A1 * | 12/2020 | Park | B66F 9/24 |
| 2021/0354920 | A1 * | 11/2021 | Zhan | B25J 9/023 |

FOREIGN PATENT DOCUMENTS

| | | | | |
|---|---|---|---|---|
| JP | H05168332 | A | 7/1993 | |
| JP | 2004018183 | A | 1/2004 | |
| JP | 2004203529 | A * | 7/2004 | B65G 1/0435 |
| JP | 2020196106 | A | 12/2020 | |
| KR | 20170134352 | A * | 12/2017 | B66F 9/063 |
| WO | WO-2020156393 | A1 * | 8/2020 | B65G 1/0435 |

\* cited by examiner

TRANSPORT SYSTEM AND TRANSPORT METHOD

CROSS-REFERENCE TO RELATED APPLICATION

This application claims priority to Japanese Patent Application No. 2021-022732 filed on Feb. 16, 2021, incorporated herein by reference in its entirety.

BACKGROUND

1. Technical Field

The present disclosure relates to a transport system and a transport method.

2. Description of Related Art

Japanese Unexamined Patent Application Publication No. 2020-196106 (JP 2020-196106 A) discloses a transport system configured such that a manipulator device and an accommodating device can travel integrally.

SUMMARY

Transport robots have had a problem that they fall down when lifting up a package to a position that is high for their own size. The technique described in JP 2020-196106 A cannot solve this problem.

The present disclosure has been made to solve such a problem, and an object of the present disclosure is to provide a transport system and a transport method for stably manipulating packages at a high position.

A transport system in the present embodiment is a transport system including a transport vehicle. The transport vehicle includes two racks, each of the two racks being configured to accommodate a plurality of boxes, and a drive arm that is disposed at a position between the two racks and that moves each of the boxes in and out of each of the racks. The transport vehicle moves each of the boxes in and out of each of the two racks by changing an orientation of the drive arm.

A transport method in the present embodiment is a transport method including a transport vehicle. The transport vehicle includes two racks, each of the two racks being configured to accommodate a plurality of boxes, and a drive arm that is disposed at a position between the two racks and that moves each of the boxes in and out of each of the racks. The transport method includes a step of moving, with the transport vehicle, each of the boxes in and out of each of the two racks by changing an orientation of the drive arm.

According to the present disclosure, it is possible to provide a transport system and a transport method for stably manipulating packages at a high position.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the present disclosure will be described through embodiments of the disclosure, but the disclosure according to the scope of the claims is not limited to the following embodiments. Not all of the configurations described in the embodiments are indispensable as means for solving the problem.

A transport system according to an embodiment will be described with reference to the drawings. The transport system according to the embodiment includes a transport vehicle 10. The transport system is a transport system in which the transport vehicle 10 transports boxes such as a reusable shipping cartons.

The transport system may be provided with a server that controls the movement of the transport vehicle 10, but the transport vehicle 10 may generate a transport route by itself to perform autonomous movement. A system in which the processing is completed in the transport vehicle and that does not include a server can also be included in the transport system according to the embodiment.

Figure 1:
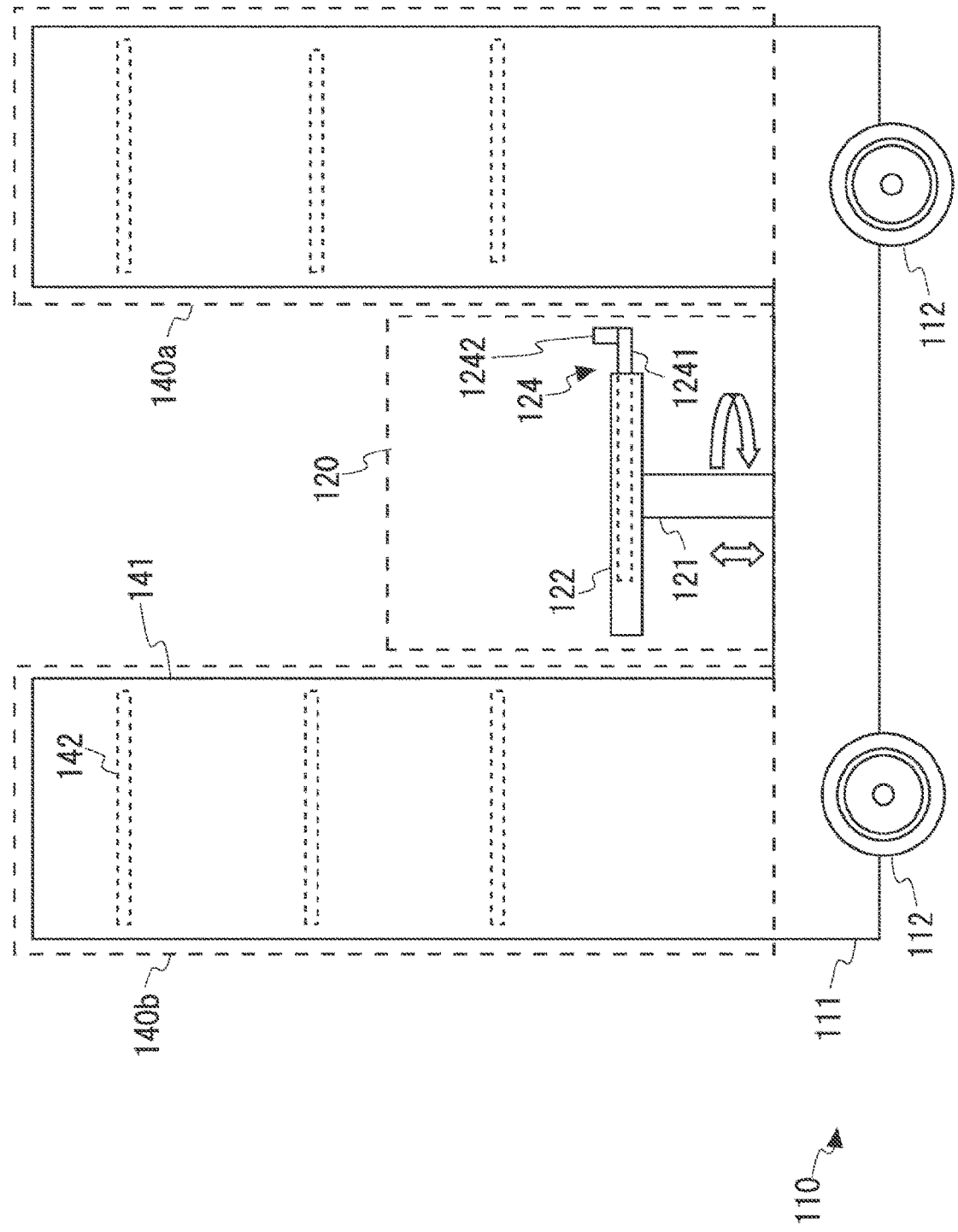
FIG. 1 is a schematic side view showing a configuration of a transport vehicle according to an embodiment.
Figure 2:
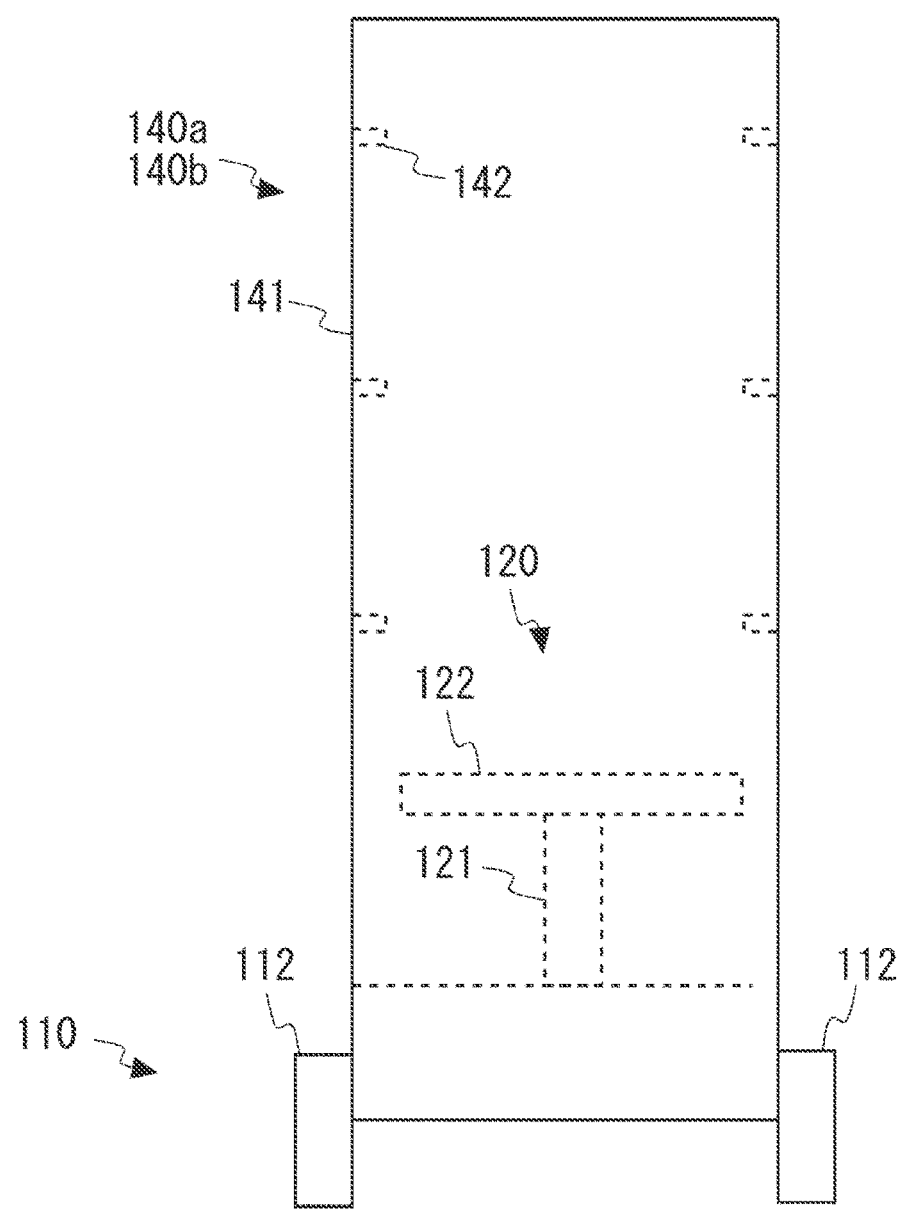
FIG. 2 is a schematic front view showing the configuration of the transport vehicle according to the embodiment.
Figure 3:
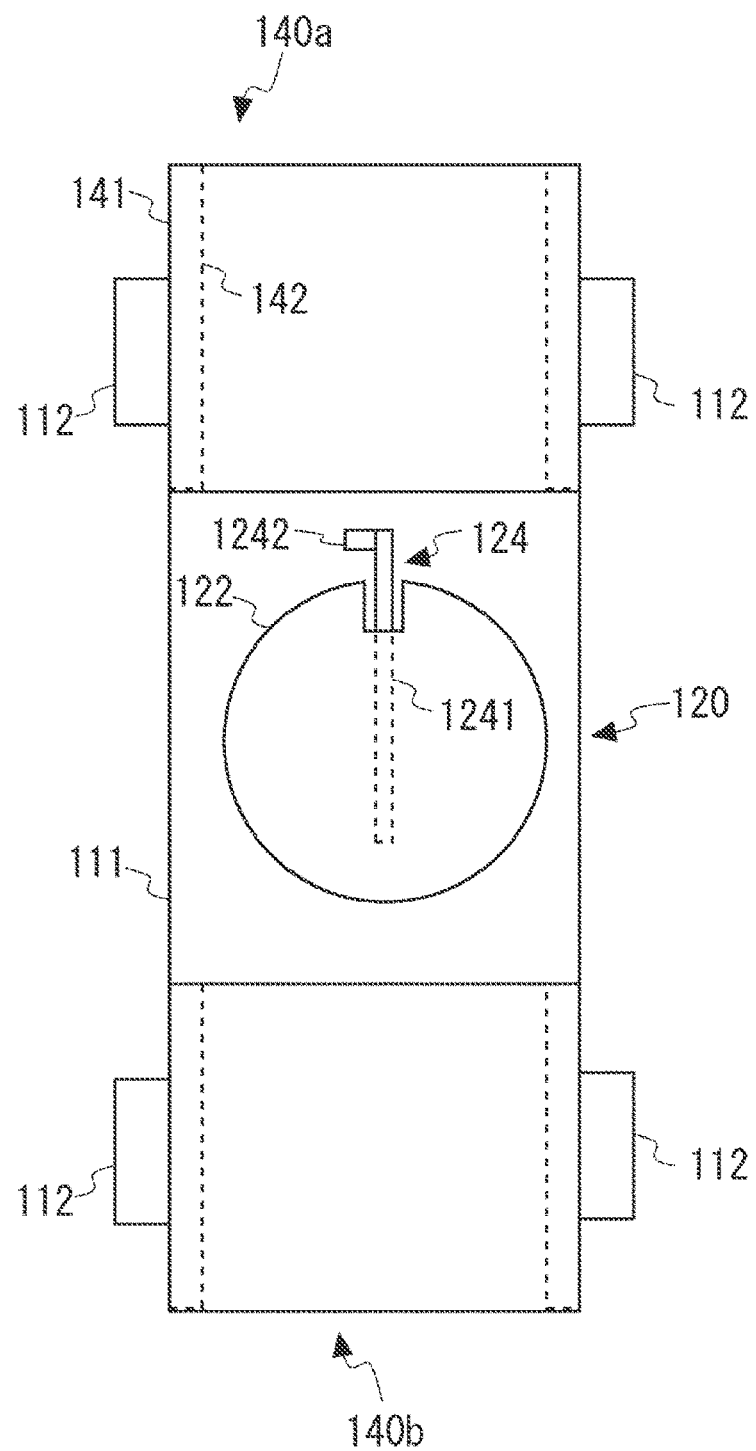
FIG. 3 is a schematic plan view showing the configuration of the transport vehicle according to the embodiment.
Figure 4:
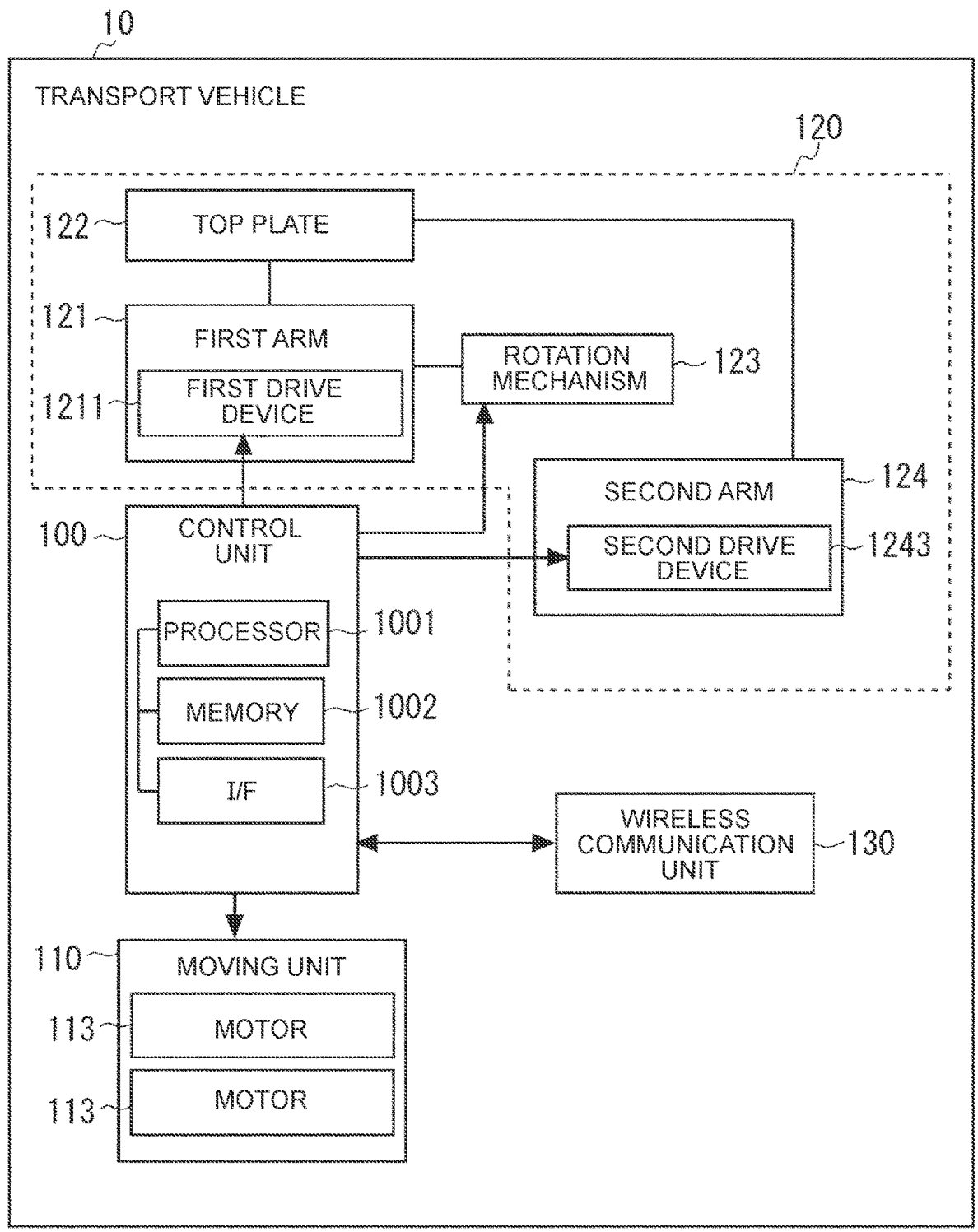
FIG. 4 is a block diagram showing functions of the transport vehicle according to the embodiment.

FIG. 1, FIG. 2 and FIG. 3 are a schematic side view, a schematic front view, and a schematic plan view, respectively, showing the configuration of the transport vehicle 10 included in the transport system according to the embodiment. FIG. 4 is a block diagram showing the functions of the transport vehicle 10. The transport vehicle 10 includes a movable moving unit 110, a drive arm 120, a control unit 100, a wireless communication unit 130, and racks 140a and 140b. The control unit 100 performs control of the transport vehicle 10 that includes control of the drive arm 120. The transport system transports the boxes accommodated in the racks 140a and 140b.

The moving unit 110 includes a vehicle body 111, two pairs of wheels 112 rotatably provided to the vehicle body 111, and a pair of motors 113 that drives the rotation of the wheels 112. The motors 113 rotate the wheels 112 via a speed reducer or the like. The motors 113 rotate the wheels 112 in response to a control signal from the control unit 100, thereby enabling forward movement, backward movement, and rotation of the vehicle body 111. With this configuration, the vehicle body 111 can move to a desired position. Note that, the configuration of the moving unit 110 is an example, and the present disclosure is not limited to this. Any configuration can be applied as long as the vehicle body 111 can be moved to a desired position. The two pairs of wheels 112 may include driven wheels.

The drive arm 120 is disposed at a position between the racks 140a and 140b. The drive arm 120 moves a box in and out of each of the racks 140a and 140b. The drive arm 120 includes a first arm 121, a top plate 122 for supporting a box placed thereon, a rotation mechanism 123, and a second arm 124. The drive arm 120 does not have to include the top plate 122. In such a case, the second arm 124 is attached to the upper end of the first arm 121.

The first arm 121 extends and retracts in the up-down direction. The first arm 121 is also referred to as an elevating mechanism. The first arm 121 may be rotatably installed on the transport vehicle 10. The first arm 121 includes, for example, a telescopic type extension-retraction mechanism. At the upper end of the first arm 121, the second arm 124 or the top plate 122 to which the second arm 124 is attached is provided. Thus, the operation of the first arm 121 raises or lowers the second arm 124. The first arm 121 includes a first drive device 1211 such as a motor, and extends and retracts with the operation of the first drive device 1211. That is, the second arm 124 is raised or lowered with the drive of the first drive device 1211. The first drive device 1211 is driven in response to a control signal from the control unit 100. In the transport vehicle 10, any configuration can be applied as long as the height of the second arm 124 can be changed as appropriate.

The rotation mechanism 123 rotates the first arm 121 by a predetermined amount with the vertical axis serving as the central axis. The predetermined amount is, for example, 90° and 180°. The rotation mechanism 123 may rotate the top plate 122 attached to the upper end of the first arm 121. The rotation mechanism 123 can change the orientation of the drive arm 120 as described later by rotating the first arm 121 and the like by the predetermined amount. The rotation mechanism 123 rotates the first arm 121 with a drive device such as a motor.

As described above, the drive arm 120 may include the top plate 122. In such a case, the second arm 124 is attached to the top plate 122. The top plate 122 includes, for example, a plate member serving as the upper face and a plate member serving as the lower face, and the second arm 124 may be accommodated between the upper face and the lower face. The shape of the plate members, that is, the shape of the top plate 122 is, for example, a flat disk shape, but may be any other shape. The top plate 122 may be provided with a notch along the line of motion of the second arm 124 such that the second arm 124 does not interfere with the top plate 122 when the second arm 124 is moved.

The second arm 124 is an arm that extends and retracts in the horizontal direction to move boxes in and out of the racks 140a and 140b. The second arm 124 is attached to the upper end of the first arm 121 or the top plate 122. The second arm 124 includes a shaft 1241 that extends and retracts in the axial direction (a direction along the shaft 1241, in other words, the longitudinal direction of the second arm 124), a protrusion 1242, and a second drive device 1243.

The protrusion 1242 extends from the shaft 1241 in a direction different from the axial direction, and engages with a groove or the like provided in the box to be transported. The protrusion 1242 may extend at the tip of the shaft 1241 in the direction perpendicular to the shaft 1241. That is, the tip of the second arm 124 may have an L shape. The shape of the second arm 124 is not limited to this. The tip of the second arm 124 may have a shape to sandwich the box to be transported.

The second drive device 1243 extends and retracts the second arm 124 in the horizontal direction in response to a control signal from the control unit 100. The second drive device 1243 may further rotate the second arm 124 with the shaft 1241 serving as the rotation axis. The second drive device 1243 includes, for example, a motor and a linear guide that extend and retract the second arm 124, but other known mechanisms may be used for these operations. The extension-retraction mechanism of the second arm 124 is not limited to the guide rail mechanism, and any configuration can be applied.

Next, the orientation of the drive arm 120 will be described with reference to FIGS. 5 to 7. It can be said that the orientation of the drive arm 120 represents a direction in which the second arm 124 extends. That is, it can be said that the rotation mechanism 123 described above changes the orientation of the second arm 124.

The transport vehicle 10 can move the box in and out of both the racks 140a and 140b by changing the orientation of the drive arm 120. Further, the transport vehicle 10 may be able to move the box in and out of a rack installed outside the transport vehicle 10 by changing the orientation of the drive arm 120.

Figure 5:
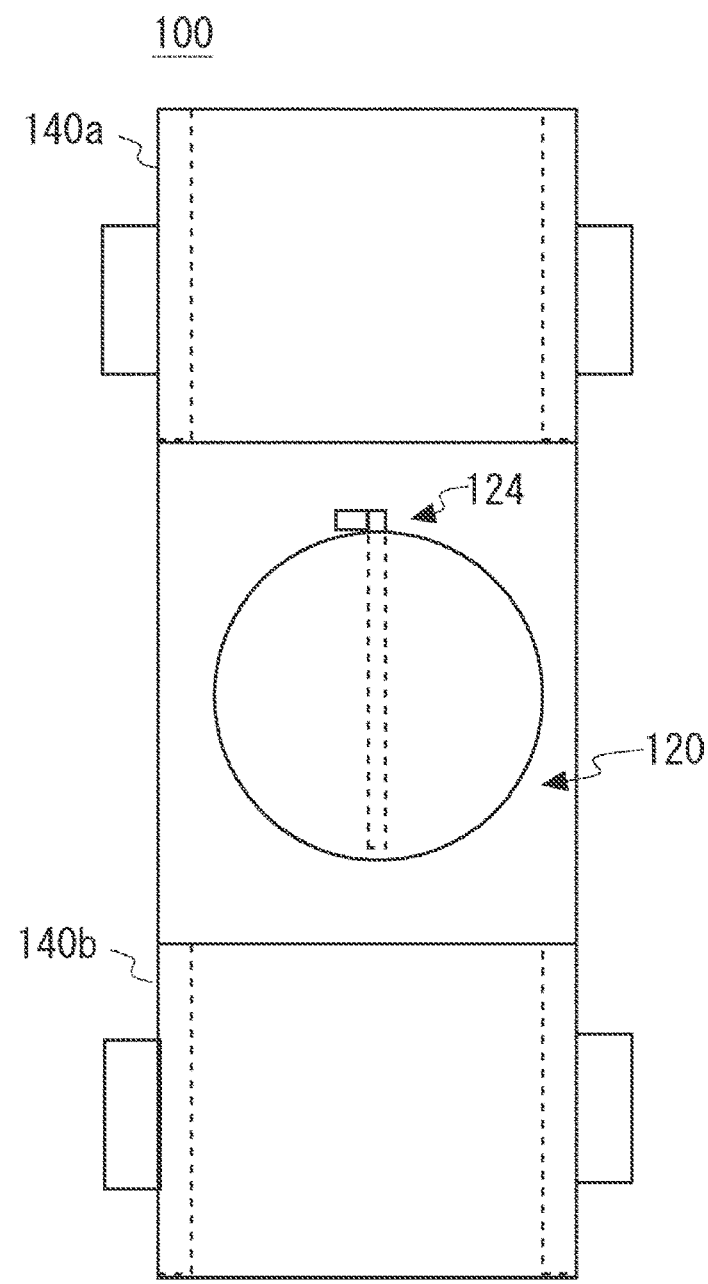
FIG. 5 is a schematic plan view showing a state in which a drive arm faces a rack 140*a*.
Figure 6:
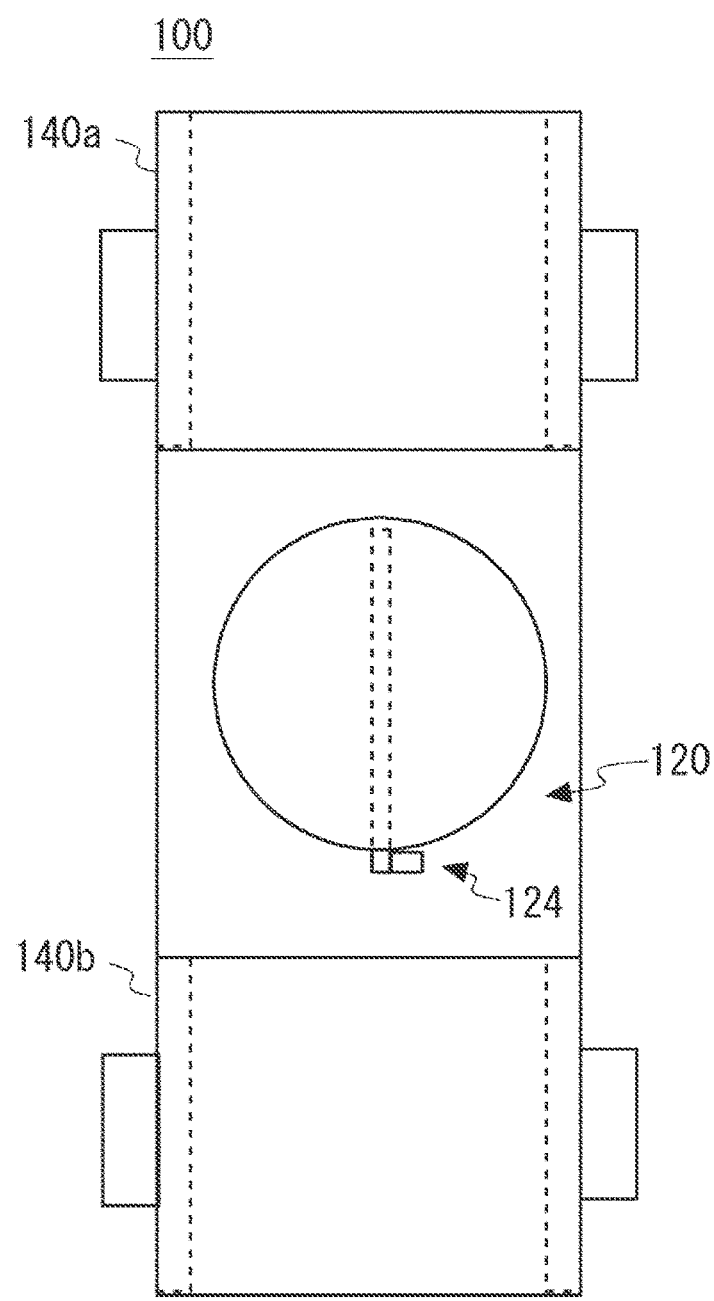
FIG. 6 is a schematic plan view showing a state in which the drive arm faces a rack 140*b*.

FIG. 5 is a schematic plan view showing a state in which the drive arm 120 faces the direction of the rack 140a. At this time, the transport vehicle 10 can move the box in and out of the rack 140a. FIG. 6 is a schematic plan view showing a state in which the drive arm 120 faces the direction of the rack 140b. At this time, the transport vehicle 10 can move the box in and out of the rack 140b. The transport vehicle 10 shifts from the state of FIG. 5 to the state of FIG. 6 by rotating the first arm 121 and the like by 180° using the rotation mechanism 123. Therefore, after moving the box out of the rack 140a, the transport vehicle 10 can rotate the first arm 121 and the like by 180° and store the box in the rack 140b. As a result, the transport vehicle 10 can transfer the box between the racks 140a and 140b. The structures of the racks 140a and 140b will be described later.

Figure 7:
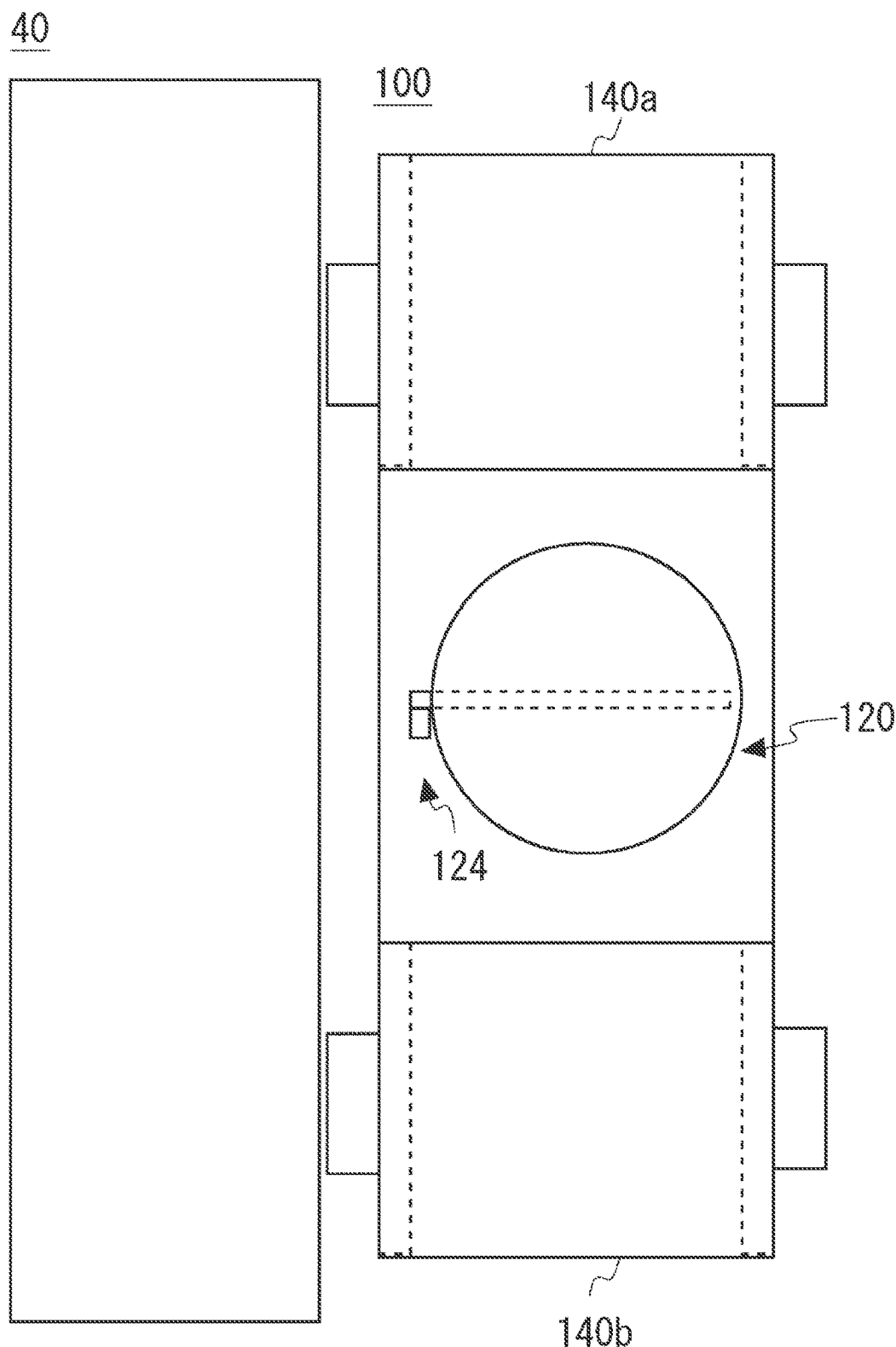
FIG. 7 is a schematic plan view showing a state in which the drive arm faces a rack 40.

FIG. 7 shows a state in which the drive arm 120 faces the direction of the rack 40 installed outside the transport vehicle 10. The structure of the rack 40 will be described later. At this time, the transport vehicle 10 can move the box in and out of the rack 40. The transport vehicle 10 shifts from the state of FIG. 5 to the state of FIG. 7 by rotating the first arm 121 and the like by 90° using the rotation mechanism 123. In such a case, the transport vehicle 10 can store the box moved out of the rack 140*a* in the rack 40 at the delivery destination. Similarly, the transport vehicle 10 can also take out the box from the rack 40 and store the box in the rack 140*a* or 140*b*.

The wireless communication unit 130 shown in FIG. 4 is a circuit for performing wireless communication to communicate with a server or a robot as needed, and includes, for example, a wireless transmission and reception circuit and an antenna. Note that, when the transport vehicle 10 does not communicate with other devices, the wireless communication unit 130 may be omitted.

The control unit 100 is a device that controls the transport vehicle 10, and includes a processor 1001, a memory 1002, and an interface (IF) 1003. The processor 1001, the memory 1002, and the interface 1003 are connected to each other via a data bus or the like.

The interface 1003 is an input-output circuit used for communicating with other devices such as the moving unit 110, the first arm 121, the rotation mechanism 123, the second arm 124, and the wireless communication unit 130.

The memory 1002 is composed of, for example, a combination of a volatile memory and a non-volatile memory. The memory 1002 is used to store software (computer program) including one or more commands to be executed by the processor, data used for executing various processes of the transport vehicle 10, and the like.

The processor 1001 may be, for example, a microprocessor, a microprocessor unit (MPU), or a central processing unit (CPU). The processor 1001 may include a plurality of processors. As described above, the control unit 100 is a device that functions as a computer.

The above-mentioned program can be stored and supplied to a computer using various types of non-transitory computer-readable media. The non-transitory computer-readable media include various types of tangible recording media. Examples of the non-transitory computer-readable media include magnetic recording media (for example, flexible disks, magnetic tapes, hard disk drives), magneto-optical recording media (for example, magneto-optical disks), compact disc read-only memory (CD-ROM), compact disc recordable (CD-R), compact disc rewritable (CD-R/W), and semiconductor memory (for example, mask ROM, programmable ROM (PROM), erasable PROM (EPROM), flash ROM, random access memory (RAM)). Further, the program may be supplied to the computer using various types of transitory computer-readable media. Examples of the transitory computer-readable media include electrical signals, optical signals, and electromagnetic waves. The transitory computer-readable media can supply the program to the computer via a wired communication path such as an electric wire and an optical fiber, or a wireless communication path.

Next, the control unit 100 will be described. The control unit 100 can control the rotation of each wheel 112 and move the vehicle body 111 to a desired position by transmitting the control signal to each motor 113 of the moving unit 110.

The control unit 100 may control movement of the transport vehicle 10 by executing known control such as feedback control or robust control based on rotation information of the wheels 112 detected by rotation sensors provided for the wheels 112. Further, the control unit 100 may cause the transport vehicle 10 to move autonomously by controlling the moving unit 110 based on distance information detected by a distance sensor such as a camera or an ultrasonic sensor provided for the transport vehicle 10 and map information on moving environment.

Further, the control unit 100 can control the height of the second arm 124 by transmitting a control signal to the first arm 121 of the drive arm 120. The control unit 100 can control the orientation of the drive arm 120 (the rotation angle of the first arm 121 or the top plate 122) by transmitting a control signal to the rotation mechanism 123. Further, the control unit 100 controls the extension and retraction of the second arm 124 by transmitting a control signal to the second drive device 1243. Here, the control unit 100 may further control the orientation of the protrusion 1242 of the second arm 124.

Next, with reference to FIGS. 1 to 3, the racks 140*a* and 140*b* will be described. Hereinafter, when the racks 140*a* and 140*b* are not distinguished from each other, the racks 140*a* and 140*b* may be collectively referred to as racks 140. The racks 140 accommodate boxes transported by the transport vehicle 10. The racks 140 are provided at the front and the rear of the transport vehicle 10. Each of the rack 140*a* and the rack 140*b* can accommodate a plurality of boxes. The racks 140 each have pairs of rails 142 for supporting the boxes.

Figure 8:
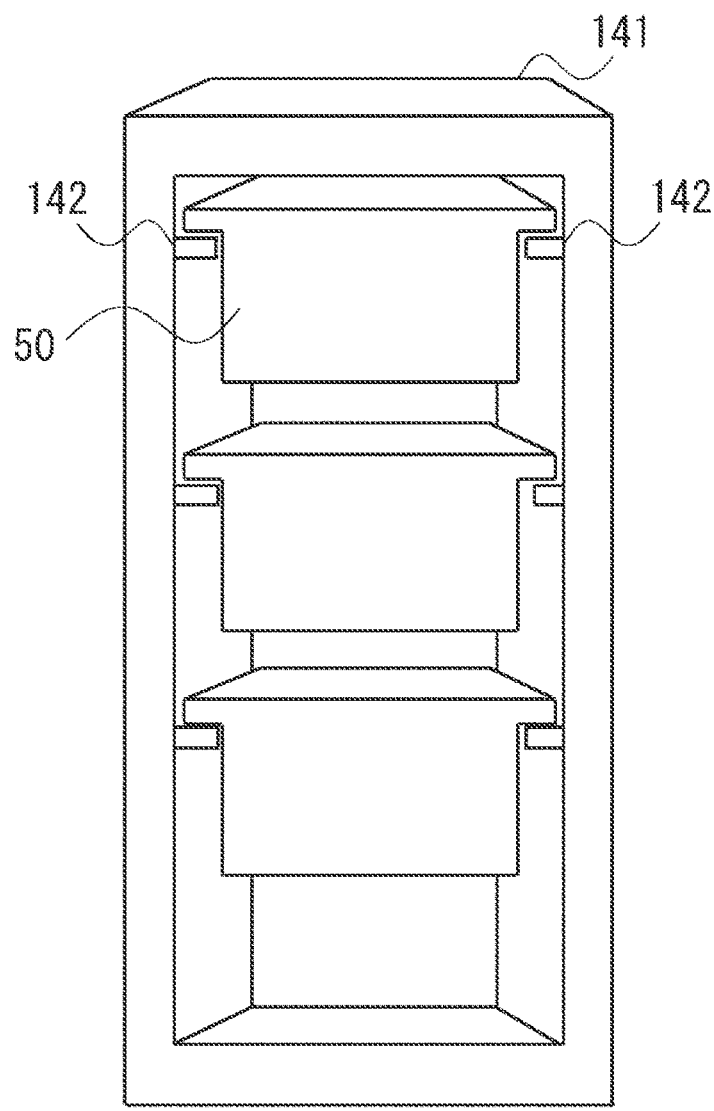
FIG. 8 is a schematic view showing an outline of the rack included in the transport vehicle.
Figure 9:
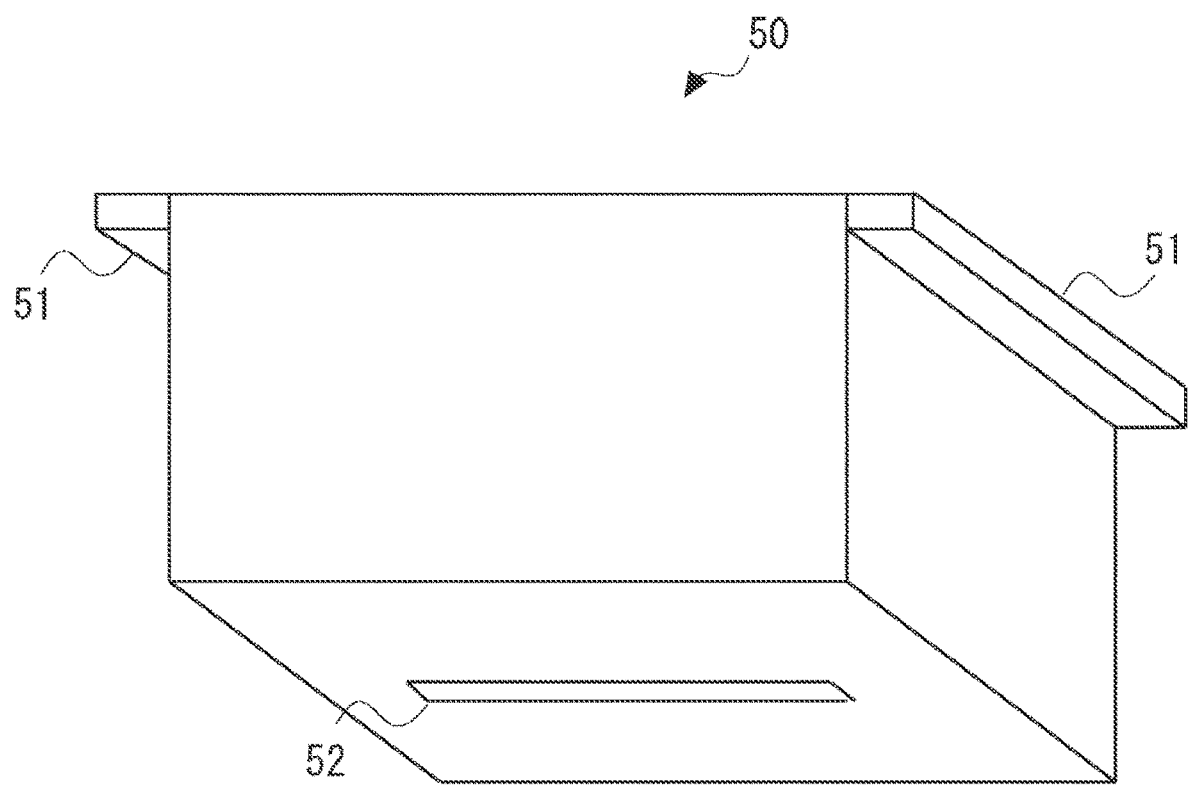
FIG. 9 is a perspective view illustrating the shape of a box to be transported by the transport vehicle.

FIG. 8 is a schematic view showing the rack 140 included in the transport vehicle 10 and boxes 50 accommodated in the rack 140. FIG. 9 is a perspective view showing the front surface, the bottom surface, and the side surface of the box 50. Wheels may be attached to the lower part of the rack 140.

The rack 140 includes a housing 141 and pairs of rails 142. As described above, the pairs of rails 142 support both sides of the boxes 50. Rails of each pair of rails 142 are provided at the same height so as to be parallel with each other. In each of the boxes 50 accommodated in the rack 140, one side of the box 50 is supported by one of the rails 142 and the other side is supported by the other of the rails 142. The rails 142 are both provided so as to extend from the front surface to the back surface of the rack 140.

For example, as shown in FIG. 9, a flange 51 is provided on both sides of the box 50. The box 50 is supported in the rack 140 as the flanges 51 are supported by the rails 142 from below. Note that, the flange 51 is provided on both sides of the box 50 so as to extend from the front surface to the back surface. In the example shown in FIG. 9, the flanges 51 are each provided in an upper portion of the side of the box 50. However, the flange 51 may be provided in a lower portion, for example, and may not necessarily be provided in the upper portion. Further, when the rails 142 support the bottom surface of the box 50, the box 50 does not necessarily have to be provided with the flanges 51.

As described above, in the rack 140, both sides of the box 50 are supported from below by the rails 142. Then, the box 50 can be moved in the front-rear direction in the rack 140 along the rails 142. That is, the box 50 is stored in the rack 140 by pushing the box 50 toward the back surface of the rack 140. Conversely, the box 50 can be taken out from the rack 140 by pulling out the box 50 toward the front of the rack 140.

As shown in FIG. 9, a groove 52 for hooking the protrusion 1242 of the second arm 124 is provided in the bottom surface of the box 50 at a predetermined position. The groove 52 may have, for example, a semi-cylindrical shape having an axial direction that coincides with the direction of pulling out the box 50. The box 50 is, for example, a rectangular parallelepiped container, but the box 50 is not limited to this and may have any shape. Note that FIG. 9 is merely an example. For example, when the second arm 124 holds the box 50, the groove 52 does not have to be provided in the box 50.

Figure 10:
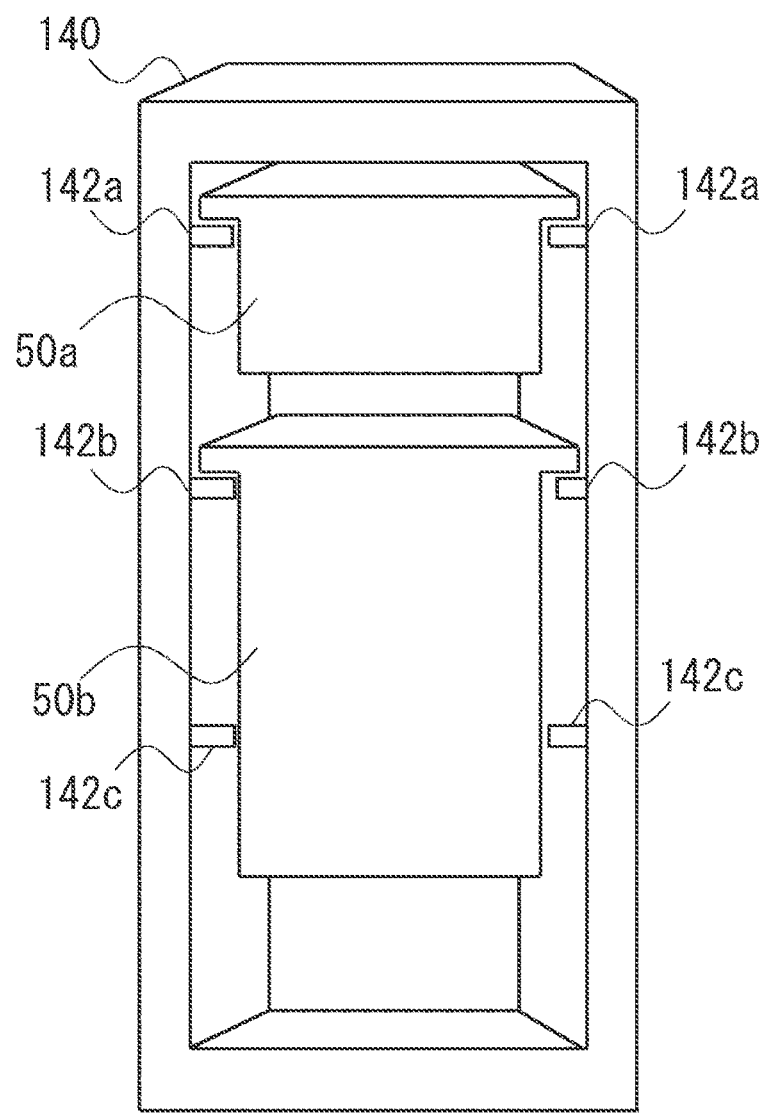
FIG. 10 is a schematic view showing a state in which the rack included in the transport vehicle accommodate boxes of different sizes.

As shown in FIG. 10, the rack 140 may be configured to accommodate boxes with a plurality of sizes set in advance. A box 50a supported by the rails 142a is smaller than a box 50b supported by the rails 142b. The rack 140 does not include the rails 142c, so that the large size box 50b can be accommodated therein. Although the boxes 50 of two sizes are accommodated in FIG. 10, the rack 140 may be capable of accommodating boxes of three or more sizes.

Figure 11:
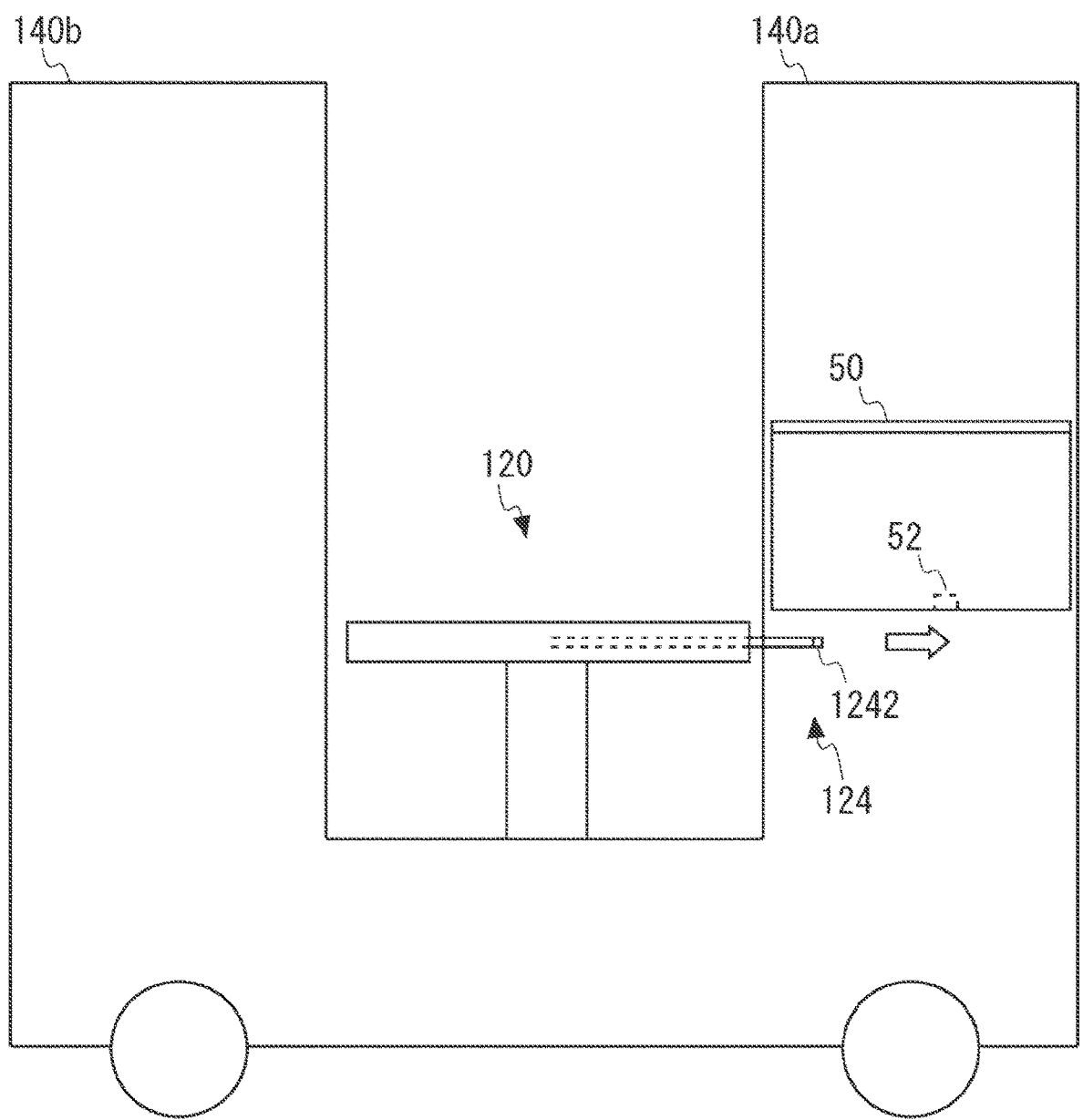
FIG. 11 is a schematic side view showing a state before the transport vehicle according to the embodiment takes out a box from the rack.
Figure 12:
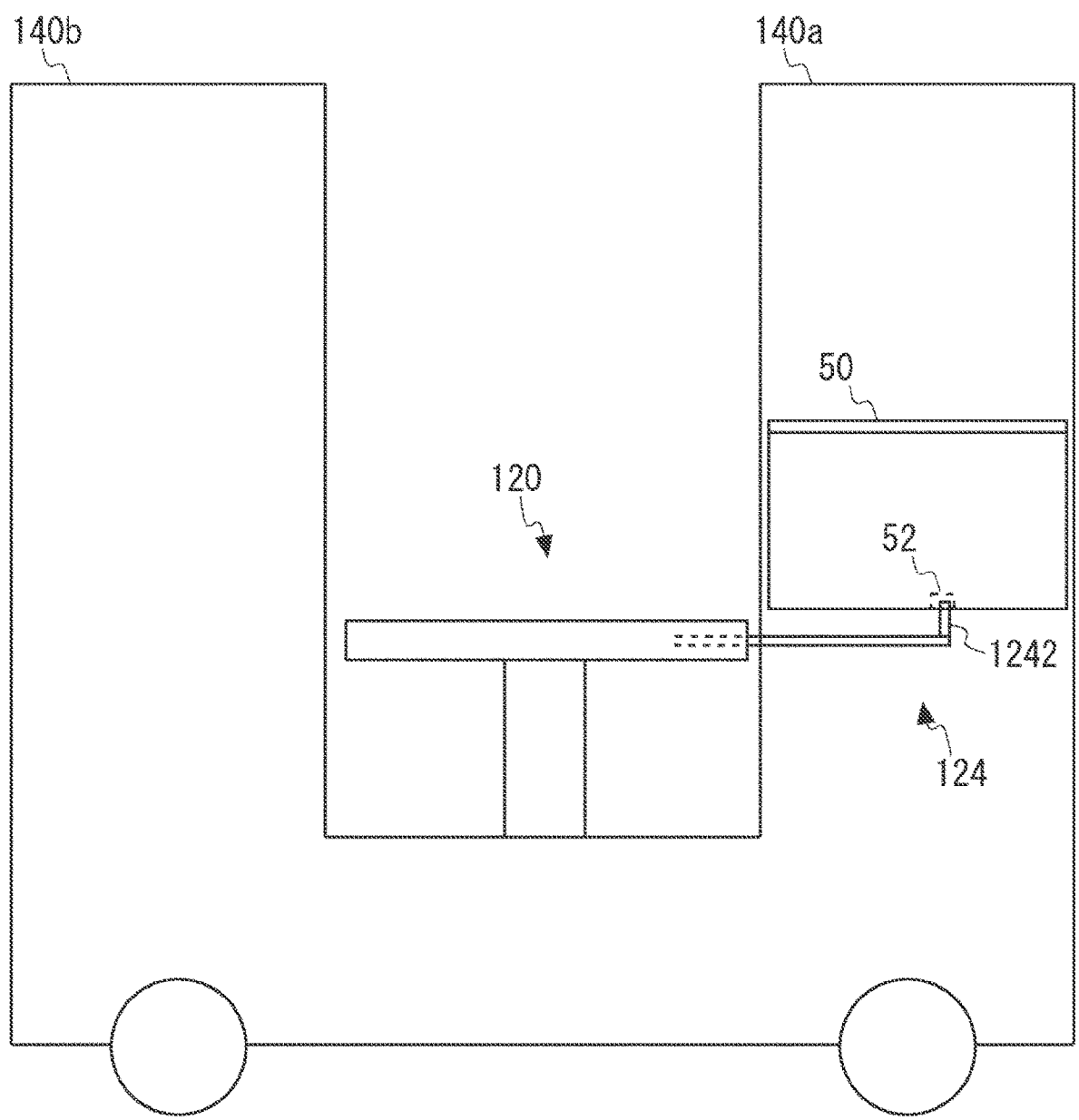
FIG. 12 is a schematic side view showing a state in which a groove provided in the box and a second arm are engaged with each other in the transport vehicle according to the embodiment.
Figure 13:
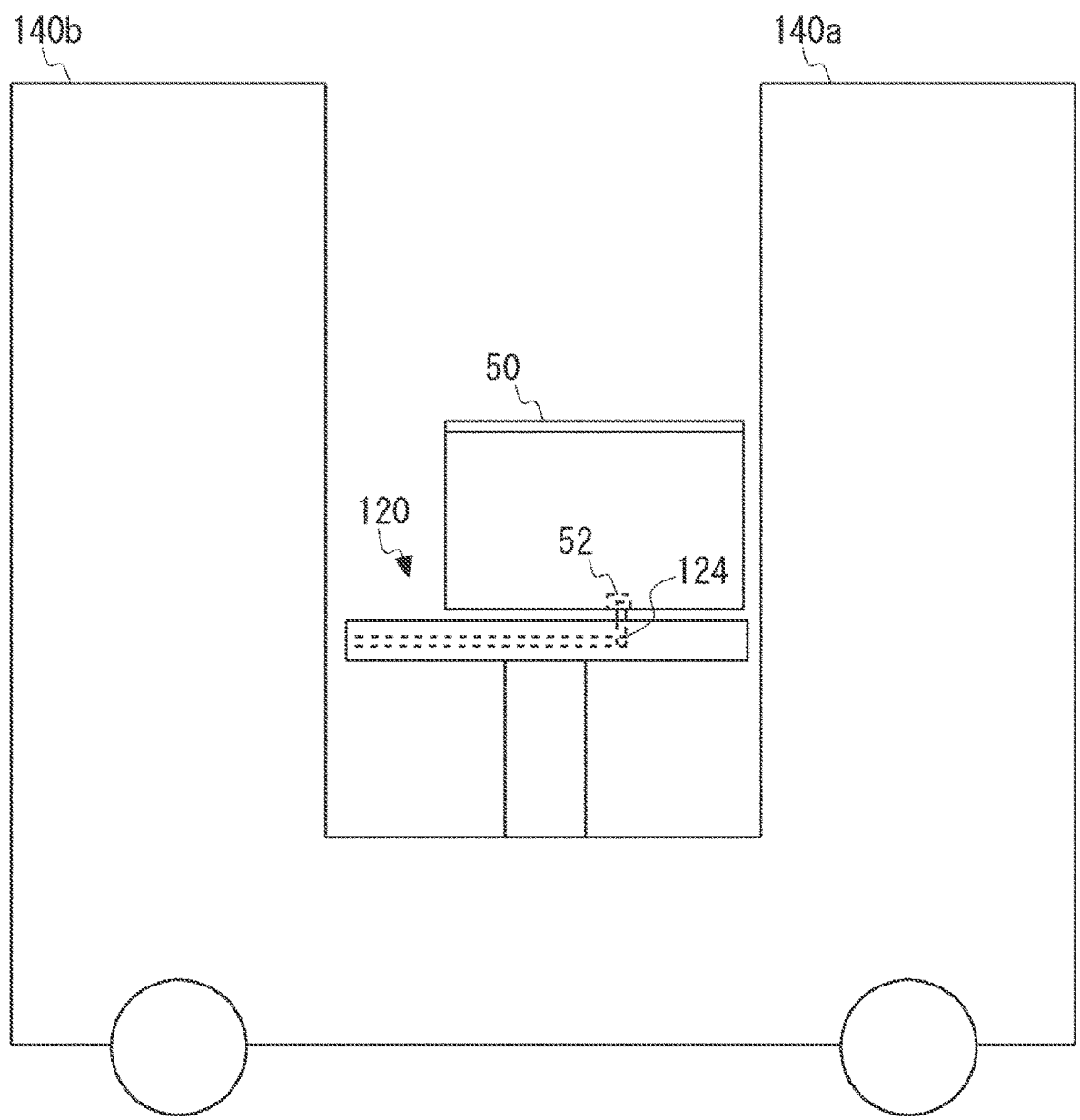
FIG. 13 is a schematic side view showing a state in which the transport vehicle according to the embodiment has taken out the box using the second arm.

Next, a method of taking out the box stored in the rack 140 will be described with reference to FIGS. 11 to 13. The control unit 100 of the transport vehicle 10 moves the box 50 in and out of the racks 140 by operating the second arm 124. FIGS. 11 to 13 are diagrams schematically showing a side view of the transport vehicle 10. For the sake of clarity, the box 50 and the second arm 124 are indicated by solid lines even when they are hidden in the rack 140a. Further, the rails 142 of the racks 140 are not shown.

As shown in FIG. 11, first, the control unit 100 extends the second arm 124 by a predetermined length and moves the protrusion 1242 of the second arm 124 to the groove 52 in the bottom surface of the box 50. The transport vehicle 10 may include a sensor such as a camera that detects the position of the groove 52 of the box 50, and may determine the length to extend the second arm 124 based on the detection result by the sensor. At this time, the direction of protrusion of the protrusion 1242 may be the horizontal direction.

Next, as shown in FIG. 12, the control unit 100 inserts the protrusion 1242 of the second arm 124 into the groove 52 of the box 50. The control unit 100 may rotate the second arm 124 such that the protrusion 1242 faces upward. The control unit 100 may extend the second arm 124 with the protrusion 1242 facing upward and then raise the top plate 122 and the second arm 124 to insert the protrusion 1242 into the groove 52.

Then, the transport vehicle 10 retracts the second arm 124. Thus, the box 50 is pulled out from the rack 140, as shown in FIG. 13.

On the other hand, the control unit 100 inserts into the rack 140 the second arm 124 hooked to the groove 52 of the box 50, that is, extends the second arm 124 by a predetermined length with the protrusion 1242 inserted in the groove 52, so that the box 50 can be stored in the rack 140.

The number of grooves 52 of the box 50 may be one as shown in FIG. 9, but may be more than one. Specifically, the bottom surface of the box 50 may have a plurality of grooves 52 arranged in the moving direction of the box 50. In such a case, when the box 50 accommodated in the rack 140 is pulled out from the rack 140, the control unit 100 of the transport vehicle 10 may hook the tip of the second arm 124 into the grooves 52 sequentially from the groove 52 on the drive arm 120 side to pull out the box 50 from the rack 140, thereby repeating the pull-out operation from the rack 140. Similarly, when the box 50 is stored in the rack 140, the control unit 100 of the transport vehicle 10 may hook the tip of the second arm 124 into the grooves sequentially from the groove on the rack 140 side, thereby repeating the push-in operation to the rack 140.

The rack 140 is integrated with the transport vehicle 10 in FIGS. 1 to 3. However, at least one of the rack 140a and the rack 140b may be configured to be separable from and reconnectable to the transport vehicle 10. In such a case, the transport vehicle 10 can select a rack 140 having an appropriate size in accordance with the quantity of boxes to be transported.

Figure 14:
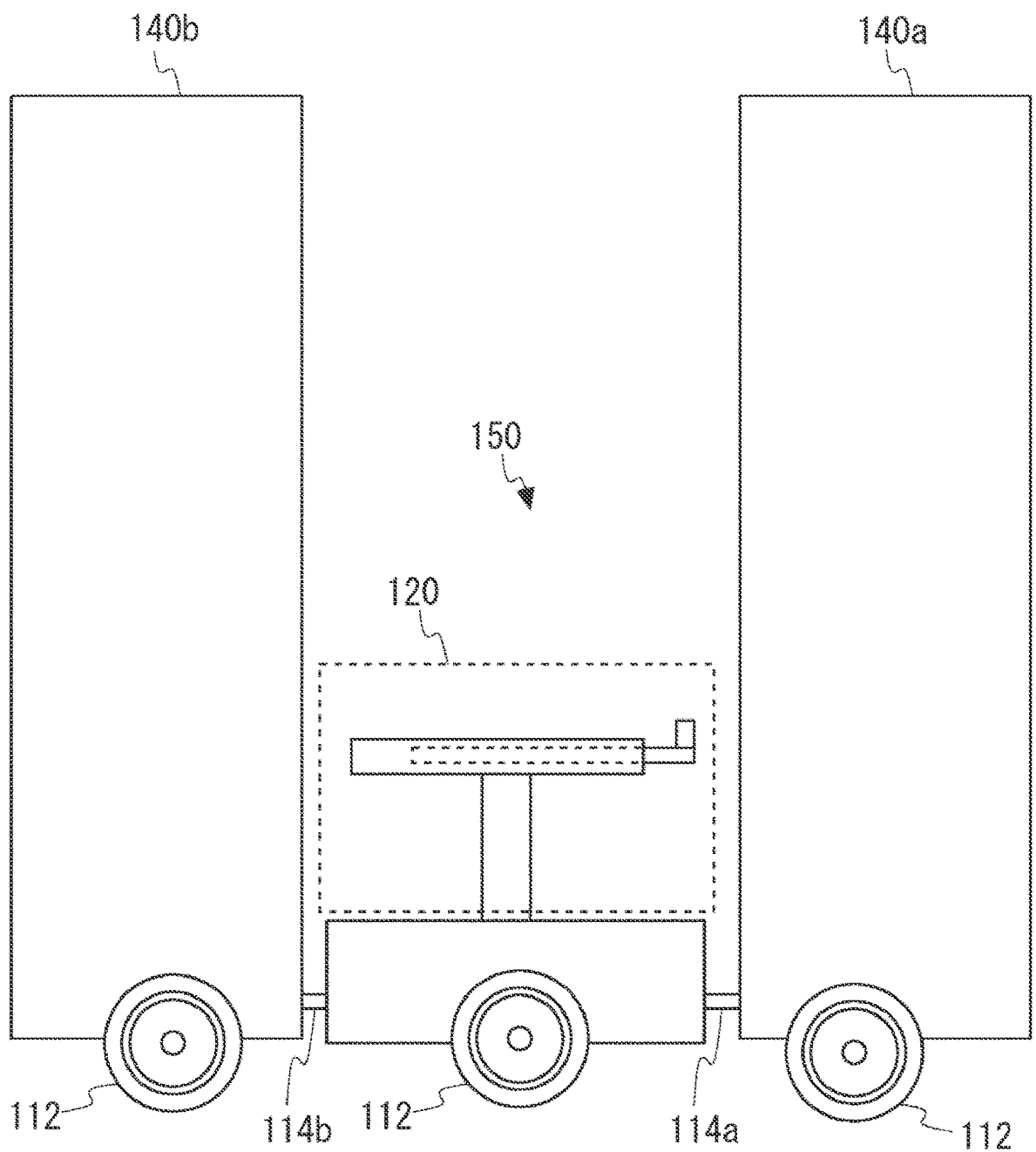
FIG. 14 is a schematic side view showing an example in which the transport vehicle according to the embodiment is separable into a transport unit and racks.

FIG. 14 is a schematic side view of the transport vehicle 10 configured to be separable into the rack 140a, the rack 140b, and a transport unit 150 including the drive arm 120, which are reconnectable. The rack 140a, the rack 140b, and the transport unit 150 each include a pair of wheels 112.

The transport vehicle 10 includes a connecting mechanism 114a and a connecting mechanism 114b. The transport unit 150 is connected to the rack 140a by the connecting mechanism 114a, and is connected to the rack 140b by the connecting mechanism 114b. Any configuration can be adopted to the connecting mechanism.

Here, the wheels 112 included in the transport unit 150 may be drive wheels for causing the transport vehicle 10 to travel, and the wheels 112 included in the racks 140a and 140b may be driven wheels. In such a case, only the transport unit 150 needs to be provided with a drive mechanism, and the rack 140a and the rack 140b do not have to be provided with a drive mechanism. In such a case, the transport vehicle 10 travels on the drive wheels included in the transport unit 150.

Figure 15:
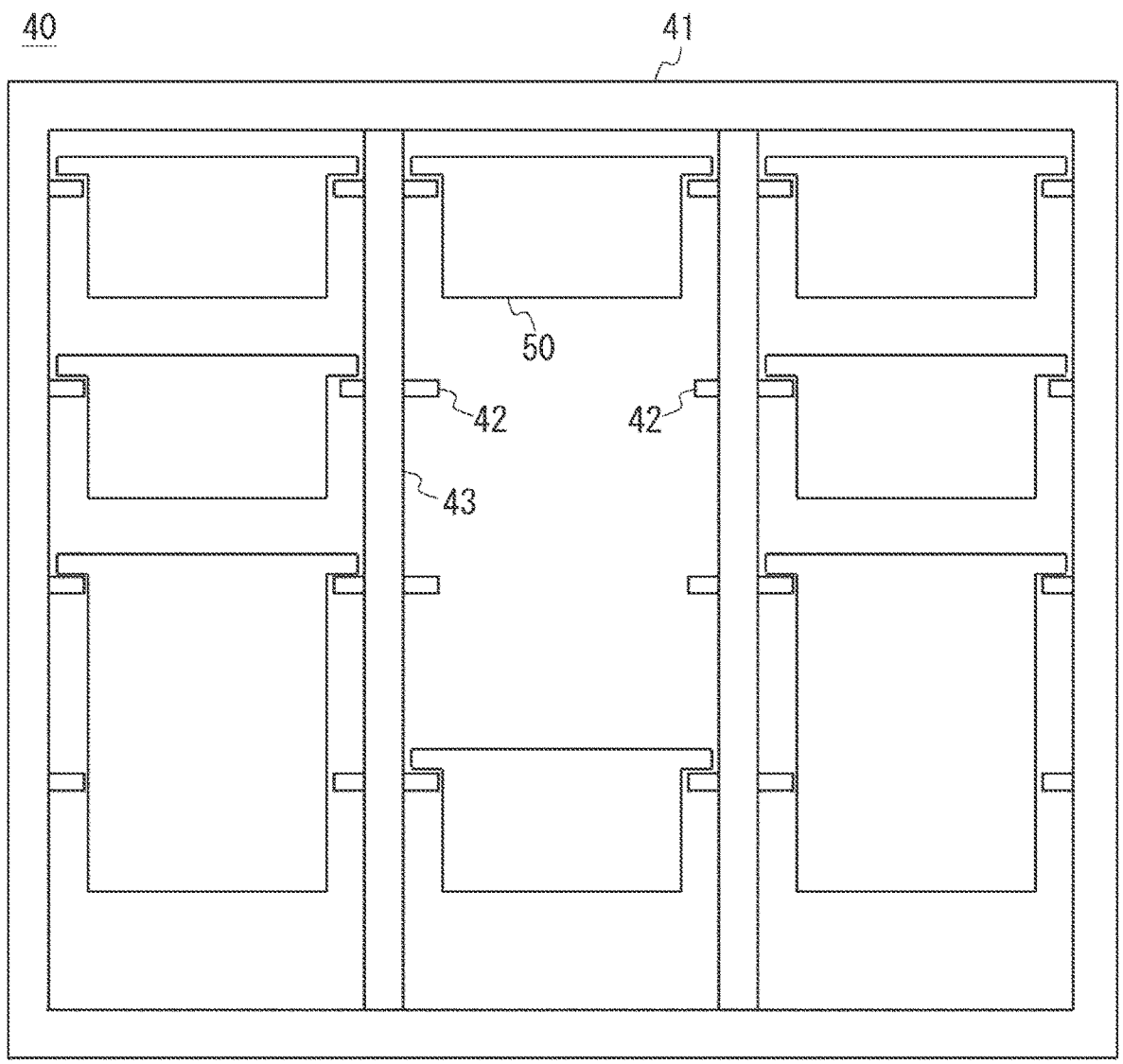
FIG. 15 is a schematic front view showing a configuration of a rack installed outside the transport vehicle.

Next, the rack 40 that is installed outside the transport vehicle 10 and that has a similar configuration as the rack 140 will be described. The transport vehicle 10 can also perform a pull-out operation and a push-in operation of the box 50 with respect to the rack 40 installed outside. FIG. 15 is a schematic front view showing a configuration example of the rack 40 installed outside the transport vehicle 10. The rack 40 may be installed outside or inside a dwelling.

The rack 40 includes a housing 41, pairs of rails 42, and partition plates 43. The housing 41 corresponds to the housing 141 of the rack 140 of the transport vehicle 10. The pairs of rails 42 correspond to the pairs of rails 142 of the rack 140 of the transport vehicle. Therefore, a detailed description will be omitted. In the example of FIG. 15, two partition plates 43 are provided, but the number of partition plates 43 is not limited at all. Further, the partition plates 43 do not have to be provided.

The transport system according to the embodiment does not have to include the rack 40 installed outside the transport vehicle 10. For example, the transport vehicle 10 may move the boxes 50 between the rack 140a and the rack 140b so as to balance the amount of boxes 50 accommodated in the rack 140a with the amount of boxes 50 accommodated in the rack 140b.

The control unit 100 of the transport vehicle 10 may move the boxes 50 such that, for example, the number of boxes accommodated in the rack 140a is equal to the number of boxes accommodated in the rack 140b. Further, the transport vehicle 10 may move the boxes 50 such that the sum of the weights of the boxes 50 accommodated in the rack 140a is equal to the sum of the weights of the boxes 50 accommodated in the rack 140b. The number of boxes 50 accommodated in each rack 140 and the sum of the weights of the boxes 50 accommodated in each rack 140 may be managed by the control unit 100. By balancing the two racks 140, the transport vehicle 10 can further improve the stability of the vehicle body.

Figure 16:
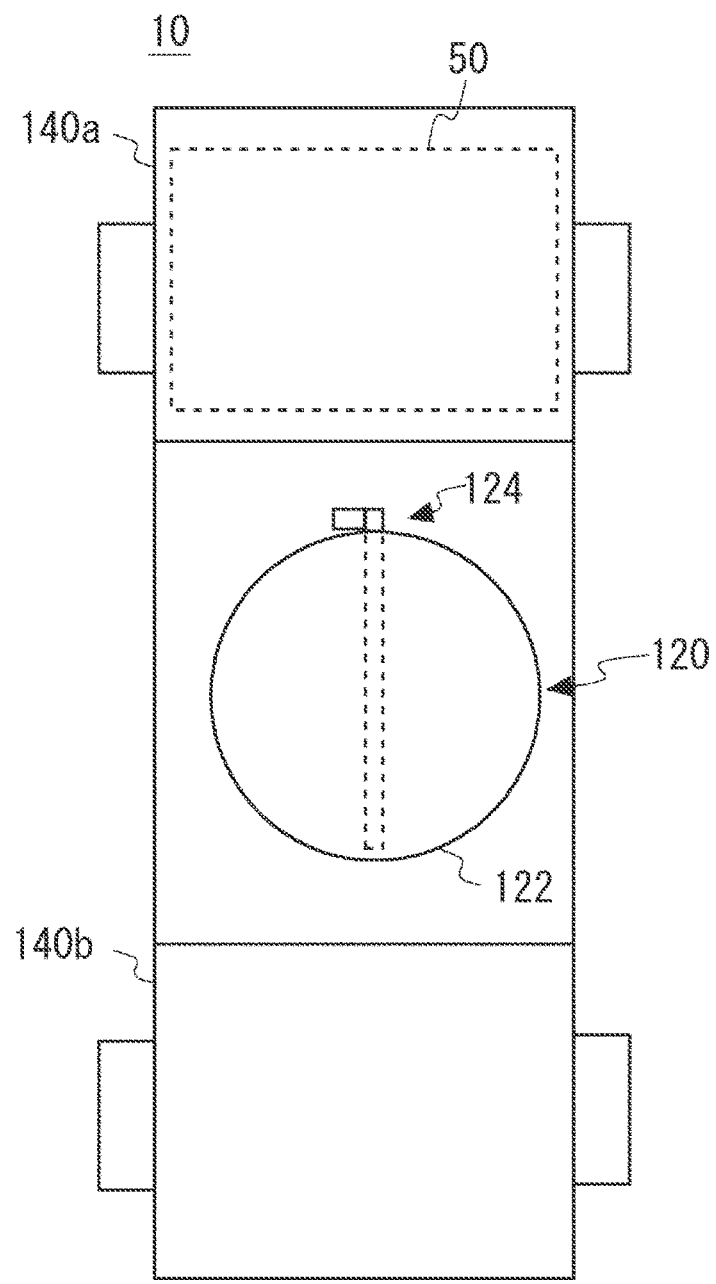
FIG. 16 is a schematic plan view showing a state before the transport vehicle according to the embodiment takes out a box from the rack 140*a*.

Next, a method in which the transport vehicle 10 moves the box 50 from the rack 140a to the rack 140b will be specifically described with reference to FIGS. 16 to 19. As shown in FIG. 16, it is assumed that the drive arm 120 faces the rack 140a. First, the transport vehicle 10 raises the top plate 122 or the second arm 124 to the height at which the box 50 to be transferred is accommodated.

Figure 17:
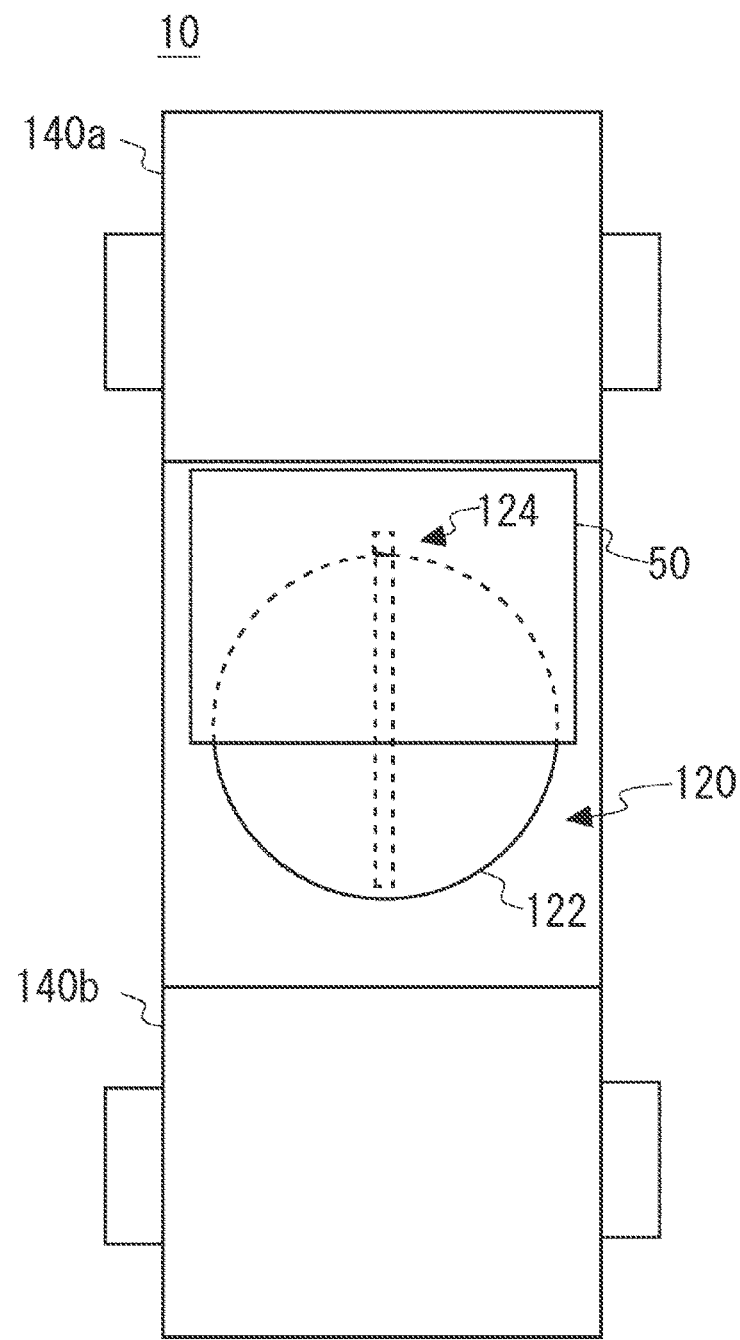
FIG. 17 is a schematic plan view showing a state in which the transport vehicle according to the embodiment has taken out the box from the rack 140*a*.

Next, as shown in FIG. 17, the second arm 124 is extended and retracted to pull out the box 50 from the rack 140a. The box 50 that has been pulled out is supported by the second arm 124 and the top plate 122.

Figure 18:
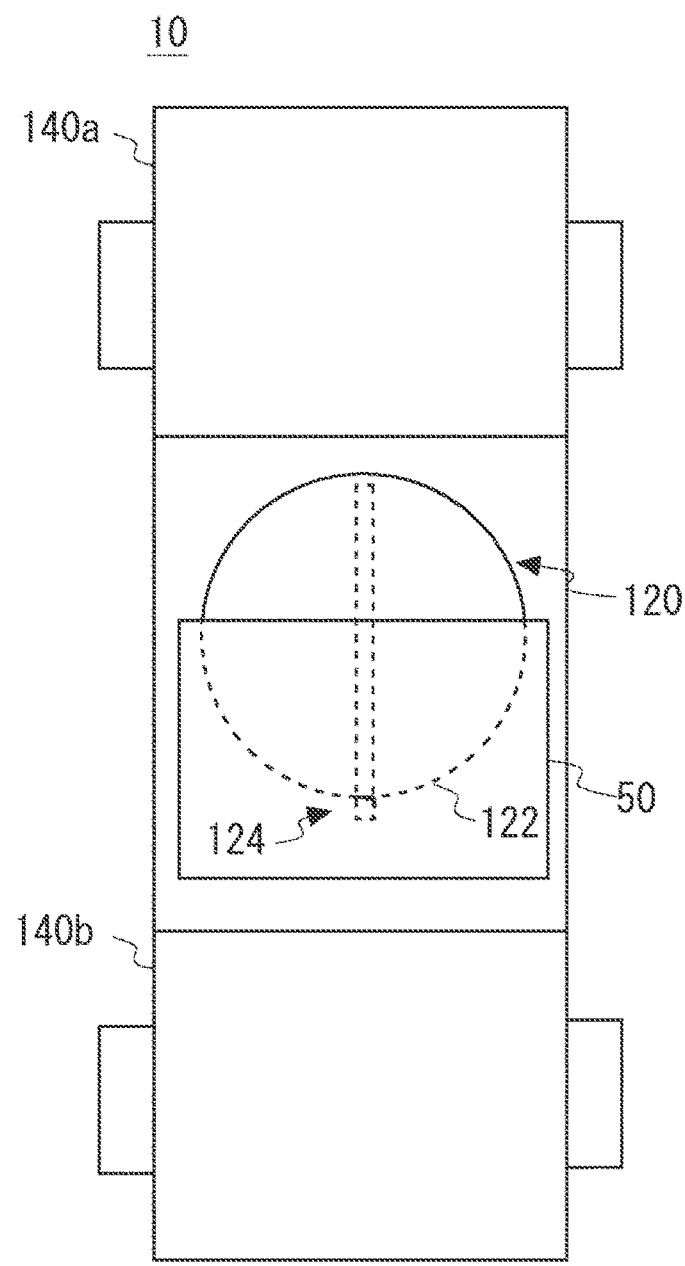
FIG. 18 is a schematic plan view showing a state in which the transport vehicle according to the embodiment has rotated the drive arm 120 after taking out the box.
Figure 19:
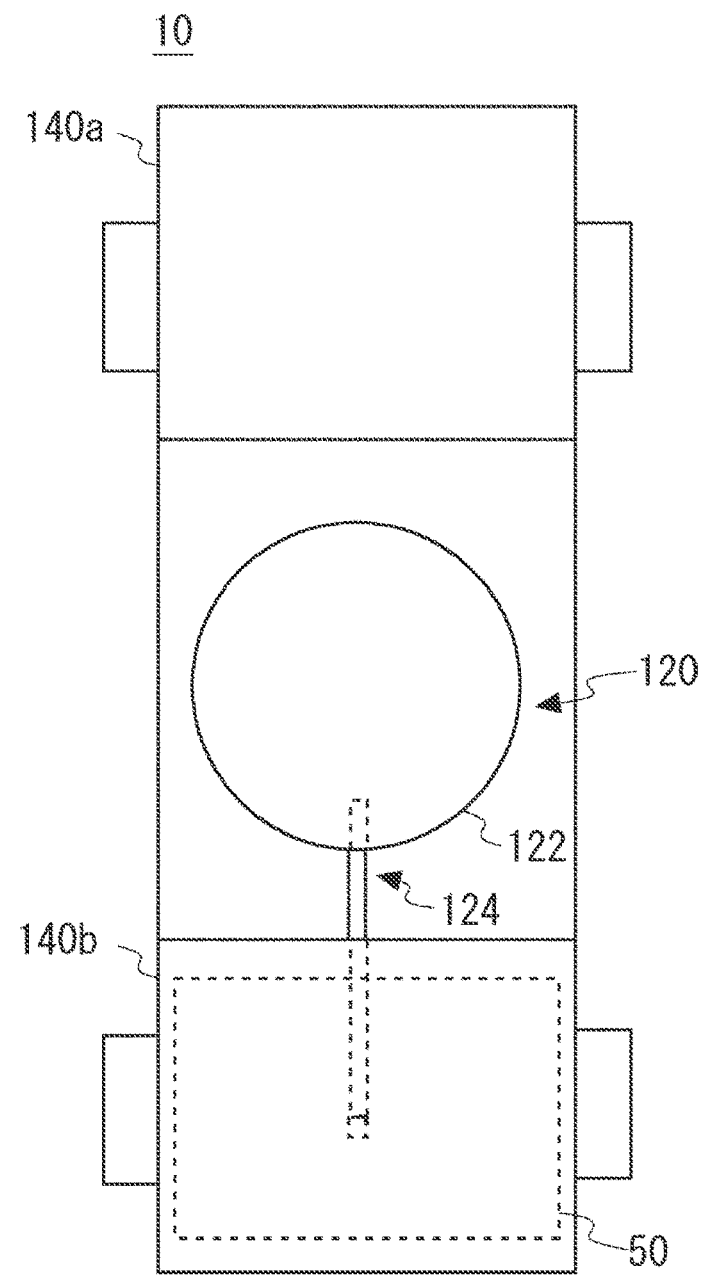
FIG. 19 is a schematic plan view showing a state in which the transport vehicle according to the embodiment has stored the box into the rack 140*b*.

Next, as shown in FIG. 18, the transport vehicle 10 directs the drive arm 120 toward the rack 140b. That is, the transport vehicle 10 controls the rotation mechanism 123 to rotate the first arm 121 or the top plate 122 by 180° around the vertical axis. Here, the box 50 is supported by the top plate 122 and the second arm 124. Next, as shown in FIG. 19, the transport vehicle 10 extends the second arm 124 and stores the box 50 in the rack 140b. The transport vehicle 10 may adjust the height of the top plate 122 or the second arm 124 before storing the box 50 in the rack 140b. After storing the box 50 in the rack 140b, the transport vehicle 10 retracts the second arm 124.

By balancing the two racks 140, the transport vehicle 10 can further improve the stability of the vehicle body. Further, by improving the stability of the vehicle body, the transport vehicle 10 can reduce the risk of falling during operation using the drive arm 120 at a high position.

Further, when the racks 140 can accommodate the boxes 50 of different sizes as shown in FIG. 10, the transport vehicle 10 transfers the boxes 50 stored in one of the racks 140 to the other of the racks 140, thereby providing a space in the one of the racks 140. As a result, the transport vehicle 10 can accommodate and transport the large box 50 even when the racks 140a and 140b do not have enough space to accommodate the large box 50.

Figure 20:
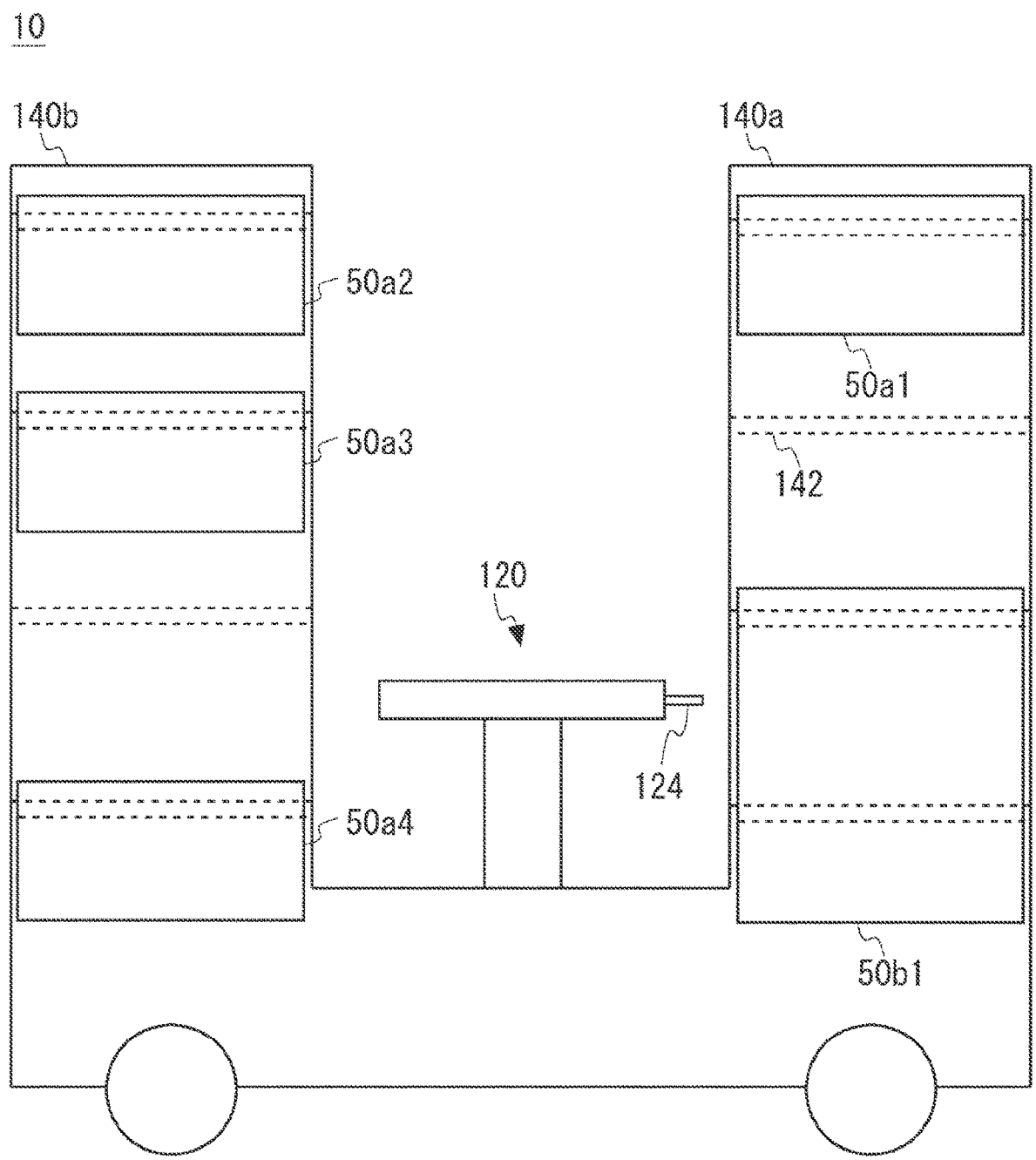
FIG. 20 is a schematic side view showing a state in which the transport vehicle according to the embodiment is transporting boxes of a plurality of sizes.

Referring to FIG. 20, the rack 140a accommodates a box 50a1 and a box 50b1 having a size larger than that of the box 50a1. Further, the rack 140b accommodates boxes 50a2, 50a3, and 50a4 having the same size as the box 50a1.

At this time, the transport vehicle 10 cannot store a box having the same size as the box 50b1 in the rack 140a or the rack 140b. However, for example, when the box 50a3 or the box 50a4 is transferred from the rack 140b to the rack 140a, the transport vehicle 10 can store the box having the same size as the box 50b1 in the rack 140b.

Hereinafter, the effects of the transport vehicle according to the embodiment will be described. When the drive arm is raised to a position that is high for the width and the depth of a small transfer robot, there is a risk that the transfer robot may fall or drop the package. The transport vehicle according to the embodiment includes a rack on both sides of the drive arm and the size of the transport vehicle is large, so it is possible to reduce the risk of falling when the drive arm is raised. Further, in the transport system according to the embodiment, it is not necessary to use both a vehicle for transporting boxes and a smaller transport robot.

The transport vehicle according to the embodiment is provided with racks at the front and the rear of the vehicle, and the drive arm can be made difficult to see from the outside. Therefore, the feeling of intimidation given to the surroundings can be reduced.

The present disclosure is not limited to the above embodiment, and can be appropriately modified without departing from the scope thereof

What is claimed is:

1. A transport system comprising a transport vehicle, wherein:
   the transport vehicle includes
      two racks, each of the two racks being configured to accommodate a plurality of boxes, and
      a drive arm that is disposed at a position between the two racks and that is configured to move each of the boxes in and out of each of the racks wherein the drive arm comprises a top plate, a shaft that extends and retracts in a longitudinal direction and a protrusion that engages a groove formed in a bottom surface of each of the boxes; and
   the transport vehicle is configured to move each of the boxes in and out of each of the two racks by changing an orientation of the drive arm, wherein:
   the transport vehicle further includes a control unit that controls operation of the drive arm; and
   the control unit is configured to move a box between the two racks so as to balance an amount of boxes accommodated in one of the two racks with an amount of boxes accommodated in another of the two racks;
   wherein the control unit is further configured to rotate the shaft such that the protrusion faces upward, extend the shaft with the protrusion facing upward, and raise the top plate and the shaft to insert the protrusion into the groove of the box being moved.

2. The transport system according to claim 1, wherein each of the two racks is configured to accommodate boxes of a plurality of sizes set in advance.

3. The transport system according to claim 1, wherein at least one of the two racks is configured to be separable from and reconnectable to the transport vehicle.

4. The transport system according to claim 3, wherein:
   the transport vehicle is configured to be separable into the two racks and a transport unit including the drive arm, the two racks and the transport unit being reconnectable to each other; and
   the transport vehicle travels on drive wheels included in the transport unit.

5. The transport system of claim 1, wherein the drive arm comprises a first arm configured to extend and retract in an up-down direction, a second arm including the shaft, the protrusion and a second drive device, and a rotation mechanism.

6. The transport system of claim 5, wherein the second arm is attached to the top plate.

7. The transport system of claim 5, further comprising a plurality of boxes in the two racks.

8. The transport system of claim 1, wherein each rack comprises a housing and a plurality of pairs of rails, each pair of rails configured to accommodate one box.

9. The transport system of claim 8, wherein each pair of rails are provided at the same height in the rack to be parallel with each other.

10. The transport system of claim 8, wherein a side of each box is accommodated on one rail among the pairs of rails.

11. The transport system of claim 8, wherein each rail extends from a front surface to a back surface of the rack.

12. A transport method including a transport vehicle, the transport vehicle including two racks, each of the two racks being configured to accommodate a plurality of boxes, and a drive arm that is disposed at a position between the two racks and that moves each of the boxes in and out of each of the racks, wherein the drive arm comprises a top plate, a shaft that extends and retracts in a longitudinal direction and a protrusion that engages a groove formed in a bottom surface of each of the boxes, the transport method comprising a step of moving, with the transport vehicle, each of the boxes in and out of each of the two racks by changing an orientation of the drive arm,
   further comprising a control step of moving a box between the two racks so as to balance an amount of boxes accommodated in one of the two racks with an amount of boxes accommodated in another of the two racks; and a control step of rotating the shaft such that the protrusion faces upward, extending the shaft with the protrusion facing upward, and raising the top plate and the shaft to insert the protrusion into the groove of the box being moved.

13. The transport method according to claim 12, wherein each of the two racks is configured to accommodate boxes of a plurality of sizes set in advance.

* * * * *